April 11, 1972     H. M. ANDERSEN ET AL     3,655,863

METHOD OF MAKING A CONTOURED COMPOSITE PRODUCT

Original Filed Oct. 24, 1967

INVENTORS
HARRY M. ANDERSEN
DAVID C. MORRIS
TOMMY L. TOLBERT
BY
*Mary B. Moshier*
ATTORNEY

United States Patent Office 3,655,863
Patented Apr. 11, 1972

---

3,655,863
METHOD OF MAKING A CONTOURED COMPOSITE PRODUCT
Harry M. Andersen, Ballwin, David C. Morris, St. Louis, and Tommy L. Tolbert, Chesterfield, Mo., assignors to Monsanto Company, St. Louis, Mo.
Continuation of application Ser. No. 677,629, Oct. 24, 1967. This application Jan. 9, 1970, Ser. No. 3,574
Int. Cl. B29c 3/00; B29d 3/02
U.S. Cl. 264—294                               4 Claims

ABSTRACT OF THE DISCLOSURE

A method of producing a compression molded, contoured composite structure with an epoxide resin matrix having dispersed therein a plurality of discontinuous, reinforcing, inorganic fibers substantially in parallel arrangement with respect to each other. A contoured mold surface is covered with an elongated, formed body of B staged epoxide resin having said fibers included therein, lengthwise and in parallel, along the length of the body. The body is positioned on said surface so as to obtain maximum parallel disposition of the fibers, with respect to each other, throughout the area, and the assembly is compression molded.

---

This application is a streamlined continuation of Ser. No. 677,629, filed Oct. 24, 1967, and now abandoned.

BACKGROUND OF THE INVENTION (1) Field of the invention

Fiber-reinforced epoxide resin composite structures.

(2) Background of the invention

Fiber-reinforced epoxide resin composites are known to possess high strength, high modulus, low density and good thermal stability. Continuous fibers are often used as the reinforcing fillers. But for various practical and theoretical reasons, the use of short or discontinuous fibers are desirable or mandatory in many cases. When a continuous filament is positioned upon a contoured surface, the stresses which are built up by change of direction result in weak areas within the molded article. Further, a number of currently available micro-fibers or whiskers are known to confer such very good mechanical properties when employed as fillers in epoxide resin composites that their use is preferred to continuous filaments of other fillers. However, such use poses serious problems. The fibers must be intimately mixed into and wetted by the matrix, and they must be present in a high volume percent concentration. To utilize their properties efficiently, the short fibers should be oriented within the matrix in an overlapping, parallel manner.

A prior attempt to solve some of these problems has involved placing the fibers in a mold cavity in the desired orientation and then impregnating the fibers with a liquid resin. This method generally requires that the fibers be relatively long with respect to the cavity, and often requires use of a vibratory mechanism to place the fibers in the mold. The large bulk volume of chopped dry fibers causes difficulties in handling and molding. Hence, it is almost impossible to align reasonably short macro-fibers such as ⅛" glass fiber by this method; the alignment of the much shorter whiskers by such a procedure is scarcely to be hoped for. Also, because the resin must be added to the fiber in the mold cavity, it is very difficult to obtain a uniform, void-free mixture containing a high volume percent of fibers. Further, because the resin must be of low viscosity to get impregnation at all, the fibers have opportunity to move when the male part of the mold applies pressure during the molding process. This results in at least partial loss of the desired orientation. Moreover, when complex shapes are to be molded, it is virtually impossible to keep the fibers from sliding and concentrating into pits or crevices thereof even before applying pressure.

These and other problems relating to utilization of very short fibers as fillers for composite structures of contoured shape, e.g., tubes, rings, angled supports, cones, cauls, bowls, pressure vessels, and containers of any shape are solved by the present invention, wherein the contoured mold surface is covered with an elongated, formed body, e.g., strand, ribbon or tape, having occluded therein a plurality of the discontinuous fibers in parallel, overlapping arrangement lengthwise, along the length of said body. The strand, ribbon or tape is wound or otherwise positioned upon the mold surface as to maintain substantially the parallel, overlapping disposition of the fibers throughout adjacent portions of the body on the contoured mold surface. The pattern of placement is governed by the patterns of stresses to be encountered by the molded object in use. Because the epoxide resin is already partially cured, conversion to the infusible stage does not require lengthy heating under pressure; moreover, the fact that the fibers are positioned in the solid, B stage resin before pressing, avoids loss of position such as that which occurs when liquid impregnants are used.

SUMMARY OF THE INVENTION

An object of the invention is to provide a method of producing new and valuable compression molded contoured composite structures comprising an epoxide resin matrix and discontinuous, inorganic reinforcing fibers as fillers therefor.

These and other objects hereinafter defined are met by the invention wherein there are provided contoured, epoxide resin structures wherein the discontinuous, inorganic reinforcing fiber is dispersed in the resin matrix in parallel arrangement. Disposition of the filler in this manner is made possible by employing the presently provided method for manufacture of the contoured composites. This method comprises covering a contoured mold surface, e.g., a female mold member, with an elongated, formed body of B stage epoxide resin having said fibers occluded therein, lengthwise and in parallel, along the length of the body. Said elongated, formed body may be a strand, or ribbon or tape. The elongated material is so positioned on the mold surface as to maintain substantially the parallel disposition of the fibers throughout adjacent portions of the body on the said surface. Thus, for covering the surface of a tubular male mold member, the strand, ribbon or tape is wound helically around the surface of the mold, and as one portion thereof abuts another, the fibers in each portion are substantially parallel to each other. Instead of winding the elongated body, suitable lengths thereof may be positioned in abutting relationship to cover the contoured surface. In either case, contoured molded bodies of any thickness may made, because the superpositioning of a portion of the elongated body upon another portion does not destroy the parallel relationship of the discontinuous fibers contained therein.

As is known to the art, B staged epoxide resins are generally soft solids. This permits easy following of the contours of the mold surface; however, if the B staged resin is not sufficiently pliant to follow truly, say an angled contour, it can be flexibilized by warming briefly. Advantageously, in positioning the elongated body upon the mold surface, overlapping is not required and, in fact, should be avoided in order to obtain a smooth surface. Whether the elongated body be a strand, ribbon or tape, placement in simple, abutting relationship suffices: contact of the thus covered surface by the male mold member during pressing is sufficient to fuse each segment to the other for formation of a void-free, continuous composite structure. In practice, the mere positioning of one flexibilized portion adjacent another, as in winding of a tubular male mold member, results in such adhesion of the segments to each other that wound material can be removed from the mold member, before pressing, as a prepreg form.

The presently employed strands, ribbons or tapes may be made by known methods, e.g., by extrusion of grains of B staged epoxide having the short fibers occluded therein in parallel arrangement, as disclosed in the copending application of Harry M. Andersen and John D. Calfee, Ser. No. 665,536, filed Sept. 5, 1967, now Pat. No. 3,461,005; by curing to the B stage a fluid mixture of epoxide resin, curing agent therefor and short fibers while applying a magnetic field; by extruding a mixture of the short fibers and a comminuted, solid, B staged epoxide resin in a magnetic field; by milling and calendaring such mixtures to obtain the desired orientation, etc.

SHORT DESCRIPTION OF THE DRAWING

DESCRIPTION OF THE PREFERRED EMBODIMENTS

Figure 1:
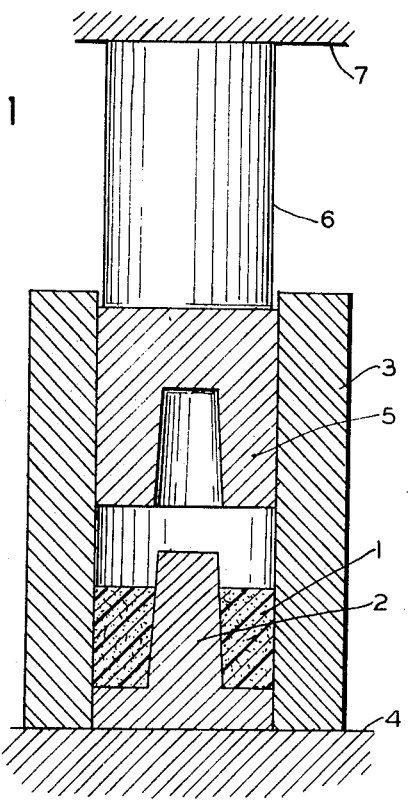
FIG. 1 is a sectional view of a molding assembly for fabricating a tubular product showing positioning before pressing.

Any elongated body of solid, B staged epoxide resin having discontinuous, reinforcing fibers occluded therein in parallel arrangement along the length of the body may be employed for covering a contoured mold surface according to the invention. However, it is preferred to employ the strand which is described in the copending application of Harry M. Andersen and John D. Calfee, Ser. No. 655,536, filed Sept. 5, 1967, now Pat. No. 3,461,005. Briefly, the strand is produced as follows: A molding composition in grain form is first made by preparing an aqueous slurry of reinforcing fibers having a length, say, from about 0.0001 inch to about 1.0 inch, stirring into the slurry a thermosettable epoxide resin and a curing agent therefor at a temperature at which the resin is liquid, continuing the stirring until the resin is advanced to the B stage, rapidly cooling the resulting reaction mixture, removing the water, and drying the residue. The dried residue consists of grains, each of which comprises a plurality of the fibers in substantially parallel arrangement and bonded to each other by the advanced resin to form an integral unit, and a film of said resin bonded to and completely enveloping said unit. The strand is made by extruding the grains through a constricted channel under temperature and time conditions such that the resin is not converted to the infusible C stage. A surfactant may or may not be present in the slurry; and the fibers may be treated, previous to incorporation into the slurry, with a coupling agent, e.g., one of the family of commercially available silane couplers such as the aminoalkoxysilanes. Also, together with the fibrous filler there may be used a small amount of a particulate filler having a maximum linear dimension of less than 0.0001 inch, e.g., clay or very fine asbestos. The particulate filler often serves as an aid in collimating the fibers, and is present in the grain interstitially between the fibers in the epoxide matrix.

As herein employed, the term "strand" refers to any elongated body obtained by extrusion through a circular orifice; however, the extrudate may be of any cross-section, depending upon that of the channel through which it is extruded; i.e., it may be rectangular, triangular, or polygonal. Although, commonly, "strand" is used in connection with continuous fiber or filament, in the present case it has been applied to the extrudate which contains a plurality of discontinuous filaments or fibers, because the matrix in which these fillers are occluded is continuous. In the present description and claims, "strand" thus includes a continuous matrix containing discontinuous fiber as reinforcement. By "elongated body" is generally meant that one dimension of a body is substantially greater than that of the other dimension or dimensions; such a body may be in the shape of a strand, rod, ribbon or tape and will have a length which is about at least 10 times and more commonly at least 30 times that of the next greater dimension. For covering certain mold surfaces with material in which short fibers are aligned in parallel along the length of the material, the narrower the material, the more uniform will be the parallelism throughout the mold surface. This is particularly true for cone- and dome-shaped molds, of course. Selection of the most advantageous width to be used on a particular surface thus merely involves known geometrical principles and in many cases, of course, will be guided by the expediency of working with very thin bodies. Because arrival at the most suitable width to length ratio for the particular mold surface to be covered is simply a matter of mathematics and commercial expediency, we do not limit ourselves to any such ratios.

Any epoxide resin in the solid B stage may be present in the elongated body. As herein employed, the term "epoxide resin" includes any resinous material containing the grouping

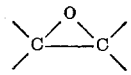

As is well known in the art, the normally liquid "A" stage epoxide resins are generally prepared by reacting polyhydroxy compounds with chlorohydrins and/or polyepoxides or mixtures thereof. Examples of commonly available epoxide resins are those made from epichlorohydrin and such polyhydroxy compounds as 4,4'-isopropylidenediphenol, resorcinol, ethylene glycol, phenol-aldehyde precondensates such as the Novolaks, etc. Examples of presently useful resins which are commercially available are the "Epons" which are manufactured by Shell Chemical Company and the "Araldites" which are manufactured by Ciba Company. Generally, the preferred epoxides are partially aromatic resins, the aromatic nature of the materials contributing to their thermal stability. A particularly preferred class has the general formula:

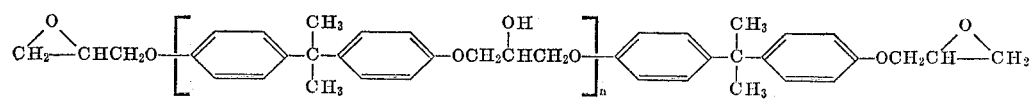

wherein $n$ denotes the degree of polymerization. A commercially available resin of the above formula, for example, is Epon 815, having an average molecular weight of about 300. Other resins of the above general formula are, e.g., Epon 826 and Epon 828. These differ from each other with respect to molecular weight and epoxide equivalent; Epon 815 has an epoxide equivalent of 175–195; whereas that of Epon 826 is 180–188. An important difference between Epon 815 and Epon 826 is that the former contains monofunctional epoxy diluents to give low viscosity; whereas the latter appears to be an undiluted resin with near-theoretical epoxide equivalent. In addition to the above-described Epons, there may be used Epon-834 or -1001 or -1031 or -1064 and Araldite-1064 or -6020. Such materials are generally liquids, or will liquify, at temperatures in the range of from about 9° to 80° C., and are in the A stage polymerization.

The epoxide resins are generally characterized by the term "Epoxide equivalent weight," which term indicates the weight of the resin that is equivalent to one epoxide group. This enables easy calculation of the amount of curing agent required by that particular resin to cure it to an infusible stage. In order to advance the polymerization to the B stage, whereby the A stage resins become fusible solids, the A stage resins are reacted with a curing agent under conditions of time and temperature which are insufficient to cure the resin to the final infusible C stage. The curing agent may be any material which reacts by cross-linking with the polyepoxides; e.g., the polycarboxylic acids and anhydrides, polyamines, polymercaptans, boron-trifluoride complexes, hydrazides, polyamides, low molecular weight phenol/formaldehyde, urea/formaldehyde or melamine/formaldehyde resins, etc. Particularly preferred are compounds containing a plurality of amino hydrogen atoms; e.g., diethylenetriamine, triethylenetetramine, melamine, dicyandiamide, m-phenylenediamine, methyllenedianiline, diaminodophenyl sulfone, etc.

For some purposes, in order to obtain products meeting certain specifications, it may be desirable to use a mixture of two or more liquid epoxide resins and/or a mixture of two or more curing agents.

The fibers which are present in the elongated body are any discontinuous, inorganic fibers which have a reinforcing effect when present in a molded composite. The term "fiber" as used herein includes filaments and whiskers of any cross-sectional shape, solid or hollow. In order to be used most effectively in complex, molded articles, they will be short fibers; e.g., they will be from, say, 0.0001" to 1.0" and preferably from about 0.03" to 0.5" in length. Preferably, the fiber will have an aspect ratio of from about 10 to 1000, although, depending upon the nature of the fiber the diameter may be lower or greater than that required by such a range. Glass fibers, being readily available and imparting very good tensile and flexural properties to epoxide composite structures, are generally useful; however, from the standpoint of simultaneous mechanical strength and thermal resistance, particularly useful are the inorganic refractory materials, e.g., filaments, fibers or whiskers of boron, graphite, niobium, tantalum, hafnium, tungsten, molybdenum, bronze, copper, lead, silver, stainless steel, silica, silicon carbide, silicon nitride, boron nitride, alumina, sapphire, zirconia, titania, etc. Any of the high-strength fibers listed in the table at page 134 of the book "Fiber Composite Materials," published by the American Society for Metals, Metals Park, Ohio, 1965, is presently useful. Naturally occurring fibers such as the comparatively long asbestos fibers, e.g., crocidolite or chrysotile, are also useful. Examples of presently commerciallly available fibers which are advantageosuly present in the elongated body as reinforcing agents are the milled alumina-silica fibers of the type supplied under the name "Fiberfax 100," the potassium titanate fibers of the type supplied under the name "Tipersul," chopped "Thornel" graphite fibers, etc.

Mixtures of fibers may be present; e.g., mixtures of, say, graphite and silica or boron and asbestos. Glass fibers are advantageously used in admixture with many of the difficultly available materials. Also, the fibers need not be of uniform length; i.e., fibers graded to a range of lengths or screened to pass a mesh size may be used. Particulated matter such as dusts and powders may be present as fillers together with the fibers. The fibers may or may not have been treated with a coupling or anchoring agent previous to incorporation into the resin matrix.

Although strand extruded from the molding grains as hrein described is the preferred elongated body for covering of the contoured mold surfaces, any strand, ribbon or tape or other thin, long body containing discontinuous, inorganic reinforcing fibers in parallel arrangement along the length of the body may be used. Means of orienting short fibers unidirectionally are well known. Thus, fibers possessing magnetic susceptibility can be oriented by application of a magnetic field so long as movement of the fibers is not impeded; hence such fibers may be suspended in a liquid hardenable resin mixture, oriented magnetically, and the resin then hardened to fix their position; see, e.g., Pat. No. 2,692,843. A fluid mixture of the filler and resin can also be extruded in a magnetic field to orient the filler, with accompanying or subsequent hardening; see, e.g., Pat. No. 2,849,312. Asbestos fibers can be oriented by proper crushing of asbestos rock, and the oriented position maintained during impregnation with a curable resin and subsequent curing; see, e.g., Pat. No. 2,640,797. The working of discrete fibers with resinous binder on mill rolls gives sheeted products in which fibers are oriented into predominantly parallel relationship; see, e.g., Pat. No. 2,033,923. In the working examples which follow, it is shown that elongated bodies other than the above-described strand may be applied to contoured mold surfaces, according to this invention, to give molded structures wherein the reinforcing, discontinuous fiber is aligned unidirectionally.

Many "B" staged epoxide resins are somewhat flexible solids; however when rigidity of the elongated body hinders proper application to the mold surface, or when the surface is unusually complex, the strand may be heated briefly to soften it. This may be done by pressing it briefly between heated plates or by radio frequency heating, employing in either case conditions of time and temperature which are insufficient to advance the resin to the infusible C stage. The strand or other elongated body may also be conditioned for improved conformance to the molding surface by moistening it with a solvent. When cooled and/or dried again, it will retain its shape so that fiber orientation therein is not sacrificed by the conditioning. When subjected to heat and pressure in the matched die mold, the matrix goes through only a brief period of fluidity, so that opportunity for loss of fiber alignment is minimized. The fluid period is sufficient, however, for the material to pick up and maintain with fidelity all detail in the mold.

Almost any shape or contour may be produced without substantially affecting the orientation of the fibers. Referring now to the drawings it will be seen that a molding assembly with which the elongated bodies may be used is a mold unit of a separable type so that members 2 and 5 of FIG. 1 may be moved apart or completely separated. Actually, the mold member 2 is a male mold member or mandrel, whereas mold member 5 is a female mold member.

Figure 2:
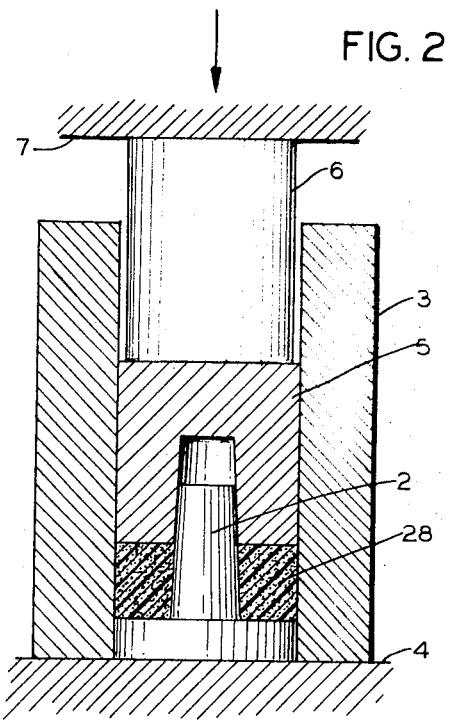
FIG. 2 is a sectional view of the assembly of FIG. 1 showing positioning after pressing.

For example, for the manufacture of a ring-shaped article or tube, the molding assembly of FIG. 1 is useful. Therein, prepregged strand or ribbon 1, comprising longitudinally oriented fibers in a thermosettable solid resin is wound around the stationary mandrel 2, which may be tapered, as shown, or cylindrical or rectangular. Mandrel 2 is housed in barrel 3 and supported by bottom press platen 4, which is heated in press. Also housed in barrel 3 and positioned and shaped to house mandrel 2 is movable female mold member 5. Pressure to said female mold member is applied through ram 6, which is in abutting relationship to top press platen 2, also heated during press. Pressure on female mold member 5 causes it to move over the mandrel to a predetermined position, compacting the prepregged strand of FIG. 1 to give the formed bearing or ring 28 of FIG. 2.

Figure 3:
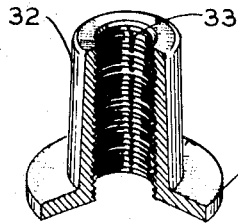
FIG. 3 is a sectional view of an internally threaded mounting bracket provided by the invention.
Figure 4:
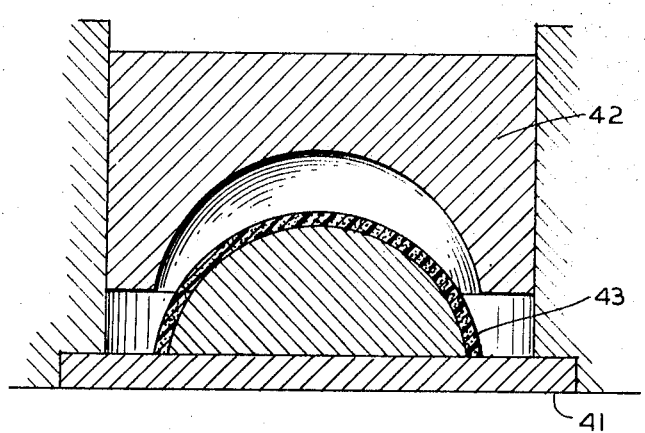
FIG. 4 is a fragmentary sectional view of a molding assembly like that of FIG. 1 wherein the mold members are dome-shaped.
Figure 5:
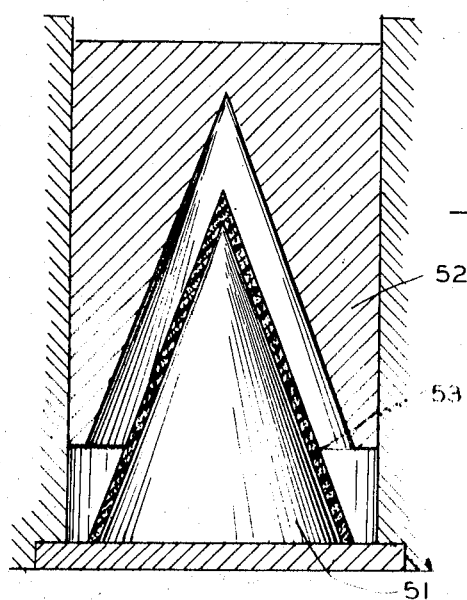
FIG. 5 is a fragmentary sectional view of a molding assembly like that of FIG. 1 wherein the mold members are pyramidal.

The shape of the molded object is dependent only upon the mold, since the elongated prepreg can ge made to conform to any surface, including such an angular surface as that presented by two perpendicular planes. Winding of the strand on a threaded tube and continuing the winding to extend over the surface of the base to which the tube is attached, results in the mounting bracket depicted in FIG. 3, wherein base 31 is perpendicular to tubular portion 32 having internal threads or grooves 33. A dome-shaped article is produced by using the molds depicted in cross-section in FIG. 4, wherein the surface of mandrel 41 is covered with strand 43 which upon being pressed by female mold member 42 gives a uniformly strong, dome-shaped housing or shield. Strand 43 may be applied to said mandrel simply by winding, beginning at either the base or apex of the dome. Similarly, the elongated prepreg may be used for fabricating a pyramidal object, employing the molds depicted in cross-section in FIG. 5, wherein mandrel 51 is wound by strand 53 for compacting by female mold member 52. It will be understood, of course, that the same objects will be obtained by covering the inner surface of the female mold member with the elongated body.

The presently provided molded articles and the method of producing the same are particularly valuable in the field of missiles and high speed aircraft, e.g., as rocket nozzles, diffusers, re-entry skin panels, rocket combustion chamber insulators, throat piece insulators, bulkhead insulators and high temperature insulating articles of all kind. The efficiency of a heat insulator in space applications is determined not only by its heat transmission characteristics, but also by its ability to resist mechanical stress and erosion at the high temperatures to which it is exposed. In molded parts containing such highly heat stable reinforcements as, for example, graphite or boron nitride fibers, the phenomenon known as chunking or spauling (the breaking away of large chunks from the prime structure) has been attributed to the randomized distribution of the fiber, resulting in localized variation of strength characteristics. Use of the presently provided articles, wherein the fibers are unidirectional, provides a significant advance in the control of chunking.

The invention is further illustrated by, but not limited to, the following examples:

EXAMPLE 1

This example shows use of a prepreg strand prepared according to the procedure described in the copending application of Harry M. Andersen and John D. Calfee, Ser. No. 665,536, filed Sept. 5, 1967. The following materials were used:

|  | G. |
|---|---|
| Epon 828 | 57.0 |
| 4,4'-methylenedianiline (MDA) | 17.0 |
| Glass fiber | 112 |
| Silicon dioxide | 14 |
| A-1100 coupler | 1.26 |

Water, 4000 ml.

Epon 828 is a liquid epoxy resin manufactured by Shell Chemical Company, having an epoxide equivalent of 190–210, an approximate weight of 10.27 lbs./gallon, a Refractive Index at 20° C. of 1.573 and a Gardner-Holdt viscosity of $Z_5$–$Z_6$ (see Pats. Nos. 2,858,291 and 3,189,510).

The glass fiber consists of 84 g. of Johns-Mansville CS–308 fiber, having a diameter of approximately 0.0004" and chopped to 1/8" lengths and 28 g. of Owens-Corning 701 fiber having the same diameter and chopped to an average length of 1/32" (ranging from about 0.005" to about 0.025").

The A-1100 coupler is Union Carbide's γ-aminopropyltriethoxysilane.

The fiber and the silicon dioxide were added to the water and then the coupling agent was added. The resulting slurry was warmed to 70° C. and the Epon 828, which had been heated to the same temperature, was gradually added, with stirring. When all of the Epon had been added, the MDA was stirred into the whole, and stirring was continued at 70° C. for an additional 30 minutes. This effected a partial cure, (B staging of the resin). The reaction mixture was then ice-cooled and water was decanted. Water-washing and air-drying of the solids gave discrete, long grains which were hard and glossy. The individual grain consisted of a bundle of parallel, aligned or collimated fibers separated from each other by the resin. The bundle of fibers was completely enveloped by the resin. A 40 volume percent of glass fiber was determined by ignition of the grains.

The grains were extruded through a 2" length of a heated (about 135° C.), 1/8" I.D. tubular orifice at about 1600 p.s.i. to give a continuous, incompletely cured, semi-flexible strand.

Long pieces of the strand were laid, one at a time on a press polish plate heated to 150° C. in a press. A metal plate was laid on the strand; and, as the resin in the strand became soft, the strand was pressed for 20 seconds into a ribbon. The resulting pliable ribbon was wrapped around the mandrel (see FIG. 1, member 2) which had been coated with a release agent, and held in place until cool and stiff. The wrapping was repeated until a layer of the ribbons, wound into helices, was built up to slightly less than 1" O.D. The resulting preform could be slipped off and on the mandrel. The ribbon-wound mandrel was then inserted into the barrel (FIG. 1, member 3), the female mold member (FIG. 1, member 5), which had been coated with a release agent, was placed on top of the mandrel, and the ram (FIG. 1, member 6) was placed on top of the female member. The assembly was placed in the press at 190° C. and a load of 2000 p.s.i. was applied to the ram and held at this temperature and pressure for 30 minutes. Pressure was then released, the assembly was disassembled, and the bearing ring into which the prepreg ribbon had been compressed was removed from the mandrel. It was post-cured for 2 hours at 150° C. to give a hard, smooth bearing having a thickness of about 1/2" and 1" O.D. and 1/2" I.D. Microscopic examination of a section of the ring showed tangential orientation of the filler fibers.

EXAMPLE 2

This example shows preparation of a molded bearing wherein approximately 1/8" lengths of boron-tungsten fiber is used as filler.

Employing the procedure of the herein described Andersen and Calfee application, there was prepared a granular molding composition by using the following materials in the indicated quantities:

|  | G. |
|---|---|
| Epon 828 | 12.8 |
| MDA | 3.8 |
| Arquad 12–50 emulsifier | 0.5 |
| Boron/tungsten fiber | 30.8 |
| Attapulgus clay | 2.7 |
| A-1100 coupler | 0.335 |

Water, 2000 ml.

The fiber, having a thickness of 1.5 mil, had been formed by vapor phase deposition of boron upon a tungsten filament to give a ca. 0.5 mil coating of the boron. The Epon resin and the coupler are described in Example 1; Arquad 12–50 emulsifier is a cationic emulsifier manufactured by Armour Chemical Company.

The granular composition was prepared by adding the fiber, the clay, and the A–1100 coupler to water containing the emulsifier, warming the resulting slurry to about 70° C., adding warm Epon 828 to the slurry, stirring in the MDA, maintaining the whole at about 70° C. for 30 minutes with continuous stirring; and finally rapidly cooling the mixture. Upon decanting the water, washing the residual solid with water and air-drying of the washed solid there were obtained discrete, hard grains having pointed ends and consisting of a plurality of the fibers in parallel arrangement and imbedded in and bonded together and completely enveloped by the resin.

The granular product was extruded to a flexible strand through a heated (ca. 135° C.), 3/16" I.D., 2" long, tubular orifice at about 800 p.s.i.

The strand was flattened into a ribbon, wound on the mandrel, and pressed and cured as in Example 1, except that pressure was applied for 1 hour instead of 30 minutes, while the mold was heating, and the ribbon layer, previous to molding, was built up to only slightly less than a ½" thickness. There was thus obtained a 1" O.D., ½" I.D., ¼" thick, hard, molded bearing.

EXAMPLE 3

This example shows use of a graphite fiber-epoxy resin strand for the production of ring bearings. The following materials were used to prepare the strand:

|  | G. |
|---|---|
| Epon 828 | 51.4 |
| MDA | 15.3 |
| Arquad 12–50 emulsifier | 2.0 |
| Graphite fiber | 33.3 |
| A–1100 coupler | 0.33 |
| Water, 4000 ml. | |

The graphite fiber is Thornel 25, manufactured by Union Carbide Corporation. It was chopped and graded for the present purpose to approximately ¼" lengths. The fiber was first added to water containing the emulsifier; then the coupler was stirred in, and the resulting slurry was warmed to 70° C. Warm (70° C.) Epon 828 was then added and finally the MDA. Stirring was continued at 70° C. for an additional 30 minutes to obtain B-staging of the resin. Rapid ice-cooling, decanting of the water from the resulting coagulate, water-washing of the residual solids, and subsequent air-drying gave encapsulated graphite. This was extruded to a semi-flexible strand through a heated (135° C.) 2" long, ⅛" I.D. circular orifice.

The strand was pressed into a ribbon as in Example 1, and the ribbon was wound around a mandrel and pressed and cured as in that example, except that pressure was applied for 1 hour, instead of for 30 minutes. Employing 4 g. of the ribbon, there was obtained a 1" O.D., ½" I.D., ⅜" thick, ring bearing.

EXAMPLE 4

Operating as in Example 3, but using the ⅛" glass fiber of Example 1 instead of graphite, there was obtained a semi-flexible strand. It was used as follows for the fabrication of a 3" O.D. glass fiber/epoxy bearing.

Tapered mandrel 2 of FIG. 1 of the drawings was inserted into barrel 3, and both were sprayed with a mold release agent. The strand was warmed uniformly in a radio frequency oven, and the warmed strand was pushed into the barrel and positioned around the mandrel. After inserting the female mold member 5 on top of the mandrel and positioning ram 6 on top of the female member, the molding assembly was heated to 190° C., and 4000 p.s.i. pressure was applied for 10 minutes at this temperature. The resulting molded ring was post-cured for 2 hours at 80° C. and 2 hours at 150° C. The ring could be easily machined by filing in the lathe. A photomicrograph showed fiber orientation therein to be tangential.

EXAMPLE 5

In this example, the glass fiber-filled strand of Example 4 was used as follows to fabricate a 2" O.D. ring bearing. The strand was warmed in a radio frequency oven to increase its flexibility and then helically inserted into the cavity between a 2" I.D. barrel and the mandrel positioned therein. A 2" O.D. ring, used as a ram extension, was placed on top of the strand-wound mandrel, and a 2" O.D. female mold member was placed on top of the ring, the internal diameter of both the ring and the female being the same. A ram was then inserted into the barrel to engage the female member, and a 5000 p.s.i. load was placed on the heated (190° C.) mold for 10 minutes. The mold was then disassembled, and the ¼" thick ring thus obtained was post-cured for 2 hours at 80° C. and then for 2 hours at 150° C. The cured product, having tangential fiber orientation, was smooth and well-dimensioned.

EXAMPLE 6

This example describes fabrication of a tube from the glass fiber-filled strand of Example 4. There was employed the molding assembly of FIG. 1, wherein barrel 3 was 10" long and had a 1" I.D. Mandrel 2 was 10" long, with tapered section from ½" O.D. at bottom to 7/16" O.D. at top. The strand was flexibilized by warming in a radio frequency oven and immediately pressed into a ribbon between two heated plates to reduce its bulk factor to about 2. The ribbon was then wound onto the mandrel as in Example 1 until a layer of helixed ribbon was built up on the mandrel to slightly less than 1" O.D. of mandrel plus ribbon layer. The mandrel was then inserted into the barrel and female mold member 5 of appropriate size was positioned on top of the strand. The assembled mold was then placed into press (platens of which had been spread to maximum spacing), and heated to 195° C. while applying a 2000 p.s.i. load. Heat and pressure were maintained for 30 minutes. Then the mold was cooled to room temperature, employing water for cooling. The resulting tube was 5" long, with an outer diameter of 1" and a tapered interior diameter which corresponded to the outer diameter of the mandrel. It was characterized by very good mechanical strength and accompanying tangential fiber orientation.

EXAMPLE 7

An extruded strand was prepared as follows: A solution of 80 parts by weight of epoxide resin Epon 826 and 24 parts by weight of 4,4'-methylenedianiline in 200 parts by weight of 2-butanone was mixed with 80 parts by weight of the ⅛" lengths of the glass fiber of Example 1. The solution was used for casting a thin film on a Teflon lined surface, drying being conducted under conditions of time and temperature which were insufficient to advance cure of the resin to the infusible C stage. On top of the film there was cast a heavy layer (10 times as thick as the film) of a relatively hard, stiff resin having occluded theerin the same lengths of the glass fiber in a volume concentration which was substantially equal to that present in the film. The layer was cast from a more viscous solution prepared substantially as the solution from which the film had been cast, but employing Epon 828 as the epoxide resin and using less of the solvent. Again, drying was conducted as in the case of the film. The resulting assembly was then fragmented and extruded to a strand through a heated (ca. 135° C.), 3/16" I.D., 2" long tubular orifice at about 1000 p.s.i. The strand was pressed into a ribbon as in Example 1, and the ribbon was wound around a mandrel and pressed and cured as in that example. The molded bearing thus obtained, showing tengential orientation of fiber, demonstrated superior toughness, impact strength, resistance to boiling water and fatigue life.

EXAMPLE 8

A prepreg strand was prepared as in Example 1, except that the silicon dioxide was omitted and that instead of using the mixture of ⅛″ and ¹⁄₃₂″ lengths of glass fiber there was employed a 1:1 volume ratio of ⅛″ glass fiber and α-silicon carbide whiskers having an aspect ratio of about 50. The strand was made pliable by radio frequency heating and wrapped on a mandrel which had been made by fixing one end of a 1″ I.D., 2″ long, exteriorly threaded tube at the center of a 2.5″ disk. Wrapping was such that after the strand had been helically wound around the tube, the top surface of the disk was covered by continuing the winding in constantly increasing circles to position the strand on the entire exposed top surface of the disk. The resultant preform had the shape of an open-ended "top" hat with a ½″ wide rim and a 1″ tall crown. The wound mandrel was placed in a female mold member of the same shape and molded as in Example 1 to give the internally threaded mounting bracket shown in FIG. 3. Examination of the molded piece by conventional microscopic and photographic techniques showed that reinforcement in the tubular part 32 is tangential and reinforcement in the base section 31 is planar with respect to the mounting surface but spiral with respect to the tubular section. Such orientation strengthens the area in which the two perpendicular planes meet; frequently accumulated tensile stresses result in cracking between base or flange and the main body of a molding. Internal threading of the molded piece was true, thus showing excellent strand-to-strand flow. Measurement confirmed that fiber orientation had been changed only slightly, if at all, from that of the strand before molding.

EXAMPLE 9

This example shows the use of an epoxide tape or ribbon having short, stainless steel fibers oriented therein.

The fibers were 304 stainless steel, having a length of about 30 mils and a diameter of about 12 microns. They were slurried in an acetone solution of Epon 828 resin which had been B-staged with 4,4′ - methylenedianiline. The concentration of steel fiber in the solution was substantially equal, by volume, to that of the resin. The slurry was poured into a very shallow Teflon tray and dried at room temperature while subjected to a magnetic field to orient the particles. Drying was continued only to the point where the film which formed was still flexible; i.e., conditions of time and temperature were used which were not conducive to advancing the resin to the infusible C stage. The resulting thin film, wherein the steel fibers were disposed in a parallel array, was cut into ½″ wide ribbons so that the fiber therein was positioned in a lengthwise, overlapping, parallel arrangement along the length of the ribbon. The ribbon was then wound around a 1″ O.D. cylindrical male mold member and pressed as in Example 1 to give a solenoid core. The tangential, spaced alignment of the steel fibers and the epoxide resin matrix reduce susceptibility to friction and wear.

EXAMPLE 10

This example shows the use of an epoxide strand wherein the filler is 5 mil tungsten-steel wire cut into ⅛″ lengths and oriented therein by means of a magnetic field. The filler was mixed with the liquid epoxide resin Epon 815 and triethylenetetramine to a thick viscous mass, the quantity of the amine with respect to the resin being calculated to be sufficient to cure the resin, and the quantity of filler being 40% by volume of the total resin plus curing agent. The mass was extruded through a ⅛″ I.D. tubular orifice at a temperature of about 135° C. while applying a magnetic field, substantially as described in the Peterman Pat. No. 2,849,312. The extrudate, a B-staged flexible strand having the fibers oriented therein lengthwise the strand, was pressed into a ribbon as in Example 1 and was used to form a hollow, square pyramid, employing the mold members shown in FIG. 5, but placing the strand within the cavity of female mold member 52, rather than on the mandrel 53 as depicted in said FIG. 5. Positioning of the strand was such that beginning at the bottom of the pyramidal hollow, parallel segments of the strand were laid horizontally with the ends of each segment meeting each other on a face of the pyramid. The entire inner surface of the mold member was thus covered with layers of the strand to build up a thickness of about ⅜″, the various segment ends meeting at diverse portions of the pyramid faces. The mandrel was then inserted, and pressing was conducted substantially as in Example 1 to give a hollow, molded piece wherein the faces of the pyramid were joined together at clean, tough edges.

EXAMPLE 11

A mixture consisting of 16.8 g. of Epon 828, 16.8 g. of Epon 1031, 30.2 g. of methyl Nadic anhydride and 0.168 g. of benzyldimethylamine was cured to the B stage, i.e., to the point where it had been converted to a soft solid, but had not yet become infusible. The product was fragmented and mixed with 260 g. of steel fiber having a thickness of 0.0059″ and a length of about ⅛″. Conventional milling and calendering of the resulting mixture to a sheet having a thickness of about ¹⁄₃₂″ effected orientation of the fiber so that up to about 90% of the fibers were disposed in the sheet parallel to each other and in the same direction, while the remainder of the fibers were less oriented. The sheet was cut into ribbons in such manner that the fibers lay lengthwise the ribbon, and then employed for winding a male mold member and pressing and curing as in Example 1.

EXAMPLE 12

The glass-filled strand of Example 1 was employed as follows in the fabrication of a box by the matching molds technique. Conventional glass fiber cloth was impregnated with a mixture of Epon 826 and 4,4′-methylenedianiline curing agent, and then "B"-staged by heating. Pieces of the resulting prepreg were cut to line the entire interior surface of the mold. After positioning the cut prepreg in the mold so that each perpendicular piece was in abutting relationship, the resulting interior corners were reinforced with a series of 2″ pieces of the warmed strand laid so that one-half of each piece was in contact with one of a pair of perpendicular planes and the other half of the piece was in contact with the other of said pair. Sufficient pieces of strand were used to leave no uncovered angles. The matching mold was then applied, and the resulting assembly was pressed at 190° C. and 2,000 p.s.i. for 30 minutes. After removing from the press, post-curing was conducted for 2 hours at 80° C. and 2 hours at 150° C. to give a box which withstood very heavy loading without cracking at the corners.

EXAMPLE 13

The strand of Example 1 was used as follows to fabricate a gear. The assembly shown in FIG. 1 of the drawings was used, except that barrel 3 had appropriate vertical grooves in the interior surface thereof. The strand was warmed and flattened as in Example 1, but instead of helically winding the ribbon directly on mandrel 2 as in that example, segments of the warm ribbon were first laid vertically, in parallel and adjacent to each other, to cover the mandrel surface. Then the ribbon was helically wound over the vertically laid layer of ribbon to give cross-plied layers. Pressing and curing of the resulting assembly as in Example 1 gave an extremely strong molded gear having bidirectional orientation of the filler fiber.

Use of the ribbons or strands for the fabrication of molded, contoured composite structures enables the tailoring of reinforcement throughout the composite in order to meet projected structural, fatigue, and environmental stresses by varying not only the manner of positioning the elongated prepreg but also the amount and type of fiber from point to point. Thus, one face of an object may be highly loaded with boron in order to meet the high stiffness requirement of that face; whereas, a second face, requiring high stiffness and moisture insensitivity, may be highly loaded with graphite fiber. A thin linkage section subjected to repeated flexing may be reinforced with an intermediate loading of glass/boron mixture; and a tensile section might be very highly loaded with glass fiber.

The present invention thus provides for the art a means of controllably varying fiber loadings over wide ranges in the molded article as a whole, or from section to section, depending on the amount of reinforcement desired. Also, it provides a means of obtaining very high levels of fiber loading, reaching levels well in excess of what can be obtained in a random system. Most significantly, it provides a means of increasing and controlling reinforcement efficiency in the specimen by orienting the fibers only in directions and at the level required to meet anticipated stresses encountered in use.

The invention provides the means of fabricating molded objects of any conceivable size or shape. Although the invention is of great value for molding of articles having an axis of revolution, it is, of course, not limited to the provision of such articles. Moldings involving angular, undulating or corrugated, ridged and grooved, plane structures are easily made; and, depending upon the positioning of the strands or ribbons, such articles as well as those having an axis of revolution, may have the discontinuous filler fiber oriented in one or more directions. Moreover, when use of difficultly available, expensive short fibers or whiskers is contemplated, the invention provides a means of placing and orienting the fiber only to meet projected stress, thus reducing the amount of reinforcing agent required to do a specific job.

Use of elongated prepreg containing overlapping, discontinuous, parallel fibers in the molding of contoured articles thus offers numerous advantages over direct molding of fiber/resin mixtures or use of prepregs containing randomly oriented fibers.

It is to be understood that although the invention has been described with specific reference to particular embodiments thereof, it is not to be so limited, since changes and alterations therein may be made which are within the full intended scope of this invention as defined by the appended claims.

What we claim is:

1. The method of making a contoured composite structure which comprises (1) covering the surface of one member of a pair of matching, contoured, male and female mold members with a plurality of segments of an elongated body of strands, ribbons or tapes, of a thermosettable, "B"-staged epoxide resin having occluded therein inorganic, discontinuous, reinforcing fibers having a length of from 0.0001 inch to 1.0 inch and an aspect ratio of from about 10 to 1000 and being in substantially unidirectional parallel, overlapping array along the length of the said body, said segments being positioned on the mold surface in abutting relationship along the lengths thereof to conform to the contoured surface while providing for maximum parallel disposition of the fibers throughout the assembly of the abutting segments;
   (2) positioning the second of said pair of mold members upon the covered surface;
   (3) compressing the assembly of segments between the mold members while heating to cure the resin to the infusible "C"-stage; and
   (4) opening the mold and removing from the mold a completed, integral composite structure wherein the reinforcing fibers are substantially oriented in parallel.

2. The method defined in claim 1, further characterized in that the contoured mold surface is the exterior surface of a tube.

3. The method defined in claim 1, further characterized in that the contoured mold surface is the exterior surface of a tube and that the elongated body is positioned thereon by winding.

4. The method defined in claim 1, further characterized in that the fibers have a length of from 0.03 inch to 0.5 inch.

References Cited

UNITED STATES PATENTS

| | | | |
|---|---|---|---|
| 2,033,923 | 3/1936 | Collier | 264—108 X |
| 2,648,098 | 8/1953 | McElligott | 264—295 X |
| 3,265,795 | 8/1966 | Medney | 264—157 |

ROBERT F. WHITE, Primary Examiner

J. H. SILBAUGH, Assistant Examiner

U.S. Cl. X.R.
264—108, 325, 331